United States Patent
Degroot et al.

(10) Patent No.: US 7,551,830 B2
(45) Date of Patent: Jun. 23, 2009

(54) IMPACT RESISTANT OPTICAL WAVEGUIDE AND METHOD OF MANUFACTURE THEREOF

(75) Inventors: Jon Degroot, Midland, MI (US); Steven Evans, Freeland, MI (US); Peter Lo, Midland, MI (US); Udo Pernisz, Midland, MI (US); Kai Su, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 0 days.

(21) Appl. No.: 12/087,433

(22) PCT Filed: Dec. 15, 2006

(86) PCT No.: PCT/US2006/048010

§ 371 (c)(1),
(2), (4) Date: Jul. 2, 2008

(87) PCT Pub. No.: WO2007/089340

PCT Pub. Date: Aug. 9, 2007

(65) Prior Publication Data

US 2009/0003758 A1    Jan. 1, 2009

Related U.S. Application Data

(60) Provisional application No. 60/764,196, filed on Feb. 1, 2006.

(51) Int. Cl.
 G02B 6/00    (2006.01)
(52) U.S. Cl. ..................... 385/143; 385/142

(58) Field of Classification Search .............. None
See application file for complete search history.

(56) References Cited

U.S. PATENT DOCUMENTS

| 3,915,924 | A | 10/1975 | Wright |
| 3,974,122 | A | 8/1976 | Sato et al. |
| 4,085,084 | A | 4/1978 | Merrill |
| 4,780,510 | A | 10/1988 | Uemiya et al. |
| 5,116,369 | A | 5/1992 | Kushibiki et al. |
| 5,217,811 | A | 6/1993 | Filas et al. |
| 5,233,007 | A | 8/1993 | Yang |

(Continued)

FOREIGN PATENT DOCUMENTS

DE     10145945 A1 *    4/2002

(Continued)

OTHER PUBLICATIONS

Norris, A., et al., "Silicone Polymers for Optical Films and Devices", Linear and Nonlinear Optics of Organic Materials II, 2002, pp. 79-86, vol. 4798, SPIE.

(Continued)

*Primary Examiner*—Sung H Pak
(74) *Attorney, Agent, or Firm*—Catherine U. Brown

(57) ABSTRACT

An impact resistant waveguide includes a clad surrounding a core. A reinforcing filler is incorporated in a curable silicone composition used to prepare the core, thereby imparting impact resistance to the core. A method of manufacture of the waveguide includes injecting the curable silicone composition into a clad made of silicone elastomeric tubing and thereafter curing the curable silicone composition.

18 Claims, 2 Drawing Sheets

U.S. PATENT DOCUMENTS

| | | | |
|---|---|---|---|
| 5,236,970 A | 8/1993 | Christ et al. |
| 5,239,035 A | 8/1993 | Maxson |
| 5,266,352 A | 11/1993 | Filas et al. |
| 5,272,013 A | 12/1993 | Raleigh et al. |
| 5,314,979 A | 5/1994 | Okinoshima et al. |
| 5,376,694 A | 12/1994 | Christ et al. |
| 5,384,383 A | 1/1995 | Legrow et al. |
| 5,420,213 A | 5/1995 | Yang |
| 5,444,106 A | 8/1995 | Zhou et al. |
| 5,494,946 A | 2/1996 | Christ et al. |
| 5,512,609 A | 4/1996 | Yang |
| 5,541,278 A | 7/1996 | Raleigh et al. |
| 5,594,424 A | 1/1997 | Louy et al. |
| 5,623,029 A | 4/1997 | Yang |
| 5,673,995 A | 10/1997 | Segaud |
| 5,739,948 A | 4/1998 | Kushibiki et al. |
| 5,955,542 A | 9/1999 | Davis et al. |
| 6,066,172 A | 5/2000 | Huo et al. |
| 6,174,079 B1 | 1/2001 | Buard |
| 6,174,983 B1 | 1/2001 | Czech et al. |
| 6,274,924 B1 | 8/2001 | Carey et al. |
| 6,277,147 B1 | 8/2001 | Christ et al. |
| 6,361,561 B1 | 3/2002 | Huo et al. |
| 6,399,734 B1 | 6/2002 | Hodd et al. |
| 6,483,981 B1 | 11/2002 | Krahn et al. |
| 6,509,423 B1 | 1/2003 | Zhu |
| 6,531,169 B2 | 3/2003 | Best et al. |
| 6,568,822 B2 | 5/2003 | Boyd et al. |
| 6,613,343 B2 | 9/2003 | Dillingham et al. |
| 6,645,246 B1 | 11/2003 | Weinschenk et al. |
| 6,727,303 B2 | 4/2004 | Ono et al. |
| 6,737,496 B2 | 5/2004 | Hodd et al. |
| 6,777,522 B2 | 8/2004 | Lai et al. |
| 6,798,792 B2 | 9/2004 | Itoh |
| 6,805,712 B2 | 10/2004 | Lai et al. |
| 6,806,509 B2 | 10/2004 | Yoshino et al. |
| 6,815,520 B2 | 11/2004 | Yoneda et al. |
| 6,844,414 B2 | 1/2005 | Lai et al. |
| 6,864,341 B2 | 3/2005 | Lai et al. |
| 6,864,342 B2 | 3/2005 | Lai et al. |
| 6,900,923 B2 | 5/2005 | Chakrapani et al. |
| 6,905,904 B2 | 6/2005 | Gardner et al. |
| 6,907,176 B2 | 6/2005 | Gardner et al. |
| 6,951,914 B2 | 10/2005 | Lai et al. |
| 7,041,631 B2 | 5/2006 | Ochs et al. |
| 7,066,955 B2 | 6/2006 | Lowery |
| 7,074,873 B2 | 7/2006 | Lai et al. |
| 7,086,765 B2 | 8/2006 | Wehner |
| 7,098,288 B2 | 8/2006 | Lai et al. |
| 7,116,484 B2 | 10/2006 | Nemoto et al. |
| 7,132,492 B2 | 11/2006 | Lai et al. |
| 7,132,493 B2 | 11/2006 | Lai et al. |
| 7,160,972 B2 | 1/2007 | Young et al. |
| 7,217,778 B2 | 5/2007 | Lambertina et al. |
| 7,242,526 B2 | 7/2007 | Nemoto et al. |
| 7,344,902 B2 | 3/2008 | Basin et al. |
| 7,352,011 B2 | 4/2008 | Smits et al. |
| 2002/0169505 A1 | 11/2002 | Jethmalani et al. |
| 2004/0023822 A1 | 2/2004 | Ochs et al. |
| 2004/0075100 A1 | 4/2004 | Bogner et al. |
| 2004/0236057 A1 | 11/2004 | Chevalier et al. |
| 2004/0257191 A1 | 12/2004 | Muller |
| 2005/0025442 A1 | 2/2005 | Kodama et al. |
| 2005/0038219 A1 | 2/2005 | Lai et al. |
| 2006/0001036 A1 | 1/2006 | Jacob et al. |
| 2007/0112147 A1 | 5/2007 | Morita et al. |
| 2008/0090332 A1 | 4/2008 | Cheng et al. |

FOREIGN PATENT DOCUMENTS

| | | | |
|---|---|---|---|
| DE | 10155274 A1 | * | 5/2003 |
| DE | 10052068 B4 | | 12/2004 |
| EP | 490321 A2 | * | 6/1992 |
| EP | 0585046 A2 | | 3/1994 |
| GB | 2073765 A | | 10/1981 |
| JP | 01-105418 | | 4/1989 |
| WO | WO 2001/074554 A2 | | 10/2001 |
| WO | WO 2003/066707 A1 | | 8/2003 |
| WO | WO 2004/037927 A1 | | 5/2004 |
| WO | WO 2006/033375 A1 | | 3/2006 |
| WO | WO 2006/045320 A2 | | 5/2006 |
| WO | WO 2006/127100 A1 | | 11/2006 |
| WO | WO 2007/086987 A1 | | 8/2007 |
| WO | WO 2007/100445 A2 | | 9/2007 |

OTHER PUBLICATIONS

Su, Kai, et. al., "Siloxane Materials for Optical Applications", Materials and Nanotechnologies, 2005, pp. C1-C8, vol. 6029, 60291C, SPIE.

Norris, Ann, et. al., "Novel Silicone Materials for LED Packaging", Fifth International Conference on Solid State Lighting, Bellingham, WA 2005, pp. 594115-1 - 594115-7, vol. 5941.

\* cited by examiner

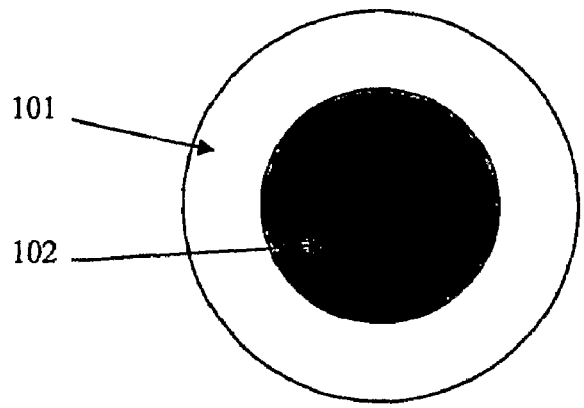
Figure 1
Figure 2. Light power transmitted through tube as function of tube length.
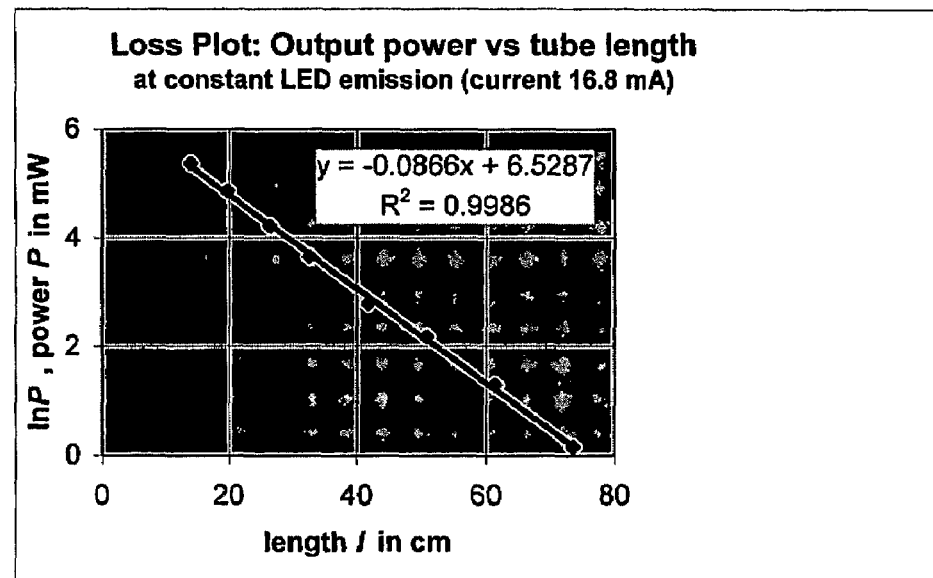

Figure 3. Response to Tube Deformation under Compression.
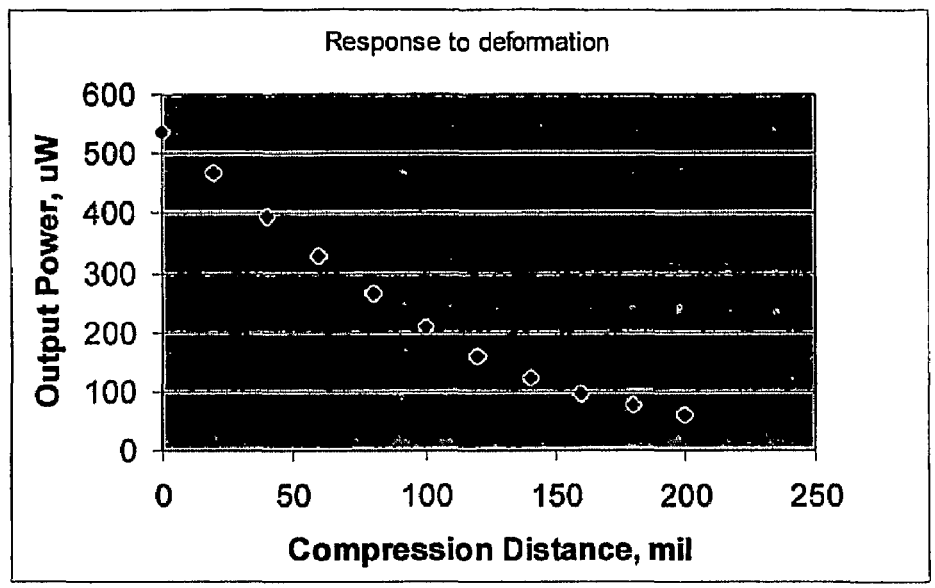
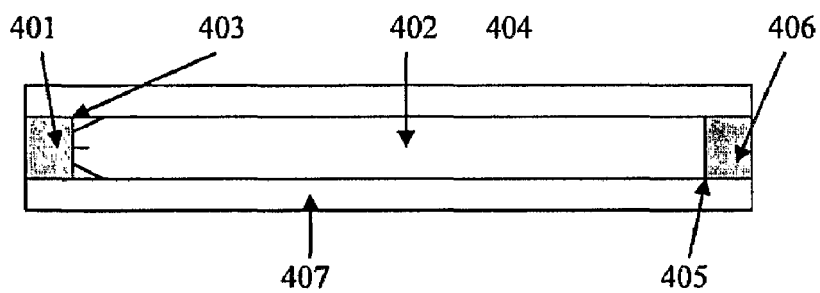
Figure 4
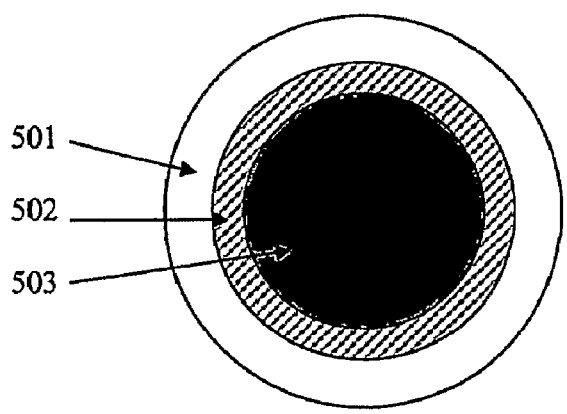
Figure 5

IMPACT RESISTANT OPTICAL WAVEGUIDE AND METHOD OF MANUFACTURE THEREOF

CROSS REFERENCE TO RELATED APPLICATIONS

This application is a U.S. national stage filing under 35 U.S.C. §371 of PCT Application No. PCT/US06/048010 filed on 15 Dec. 2006, currently pending, which claims the benefit of U.S. Provisional Patent Application No. 60/764,196 filed 1 Feb. 2006 under 35 U.S.C. §119 (e). PCT Application No. PCT/US06/048010 and U.S. Provisional Patent Application No. 60/764,196 are hereby incorporated by reference.

TECHNICAL FIELD

This invention relates to impact resistant optical waveguides and efficient methods for the manufacture thereof.

BACKGROUND

Sensors comprising a waveguide composed of a core and a clad each made from an elastomeric material are known. Such a sensor may include light emitting means and light receiving means each connected to ends of the optical waveguide. The core or clad, or both, may be transparent, and the core has a refractive index somewhat larger than that of the clad. Both core and clad may be made from a synthetic rubber or gel.

Compositions used in preparing waveguides have been disclosed, for example in U.S. Pat. No. 4,529,789. However, this composition cures to form a gel having inadequate refractive index and insufficient impact resistance for some applications. The resin present in this composition may also cause cloudiness, which is undesirable for optical waveguide applications.

Existing waveguides are frequently prepared by first fabricating a core and thereafter coating the core with a clad material. Such methods include extruding a high viscosity transparent composition through a nozzle, curing the composition to form the core, applying a liquid clad material to the outer periphery of the core, and thereafter curing the clad material. Sensors made from such waveguides suffer from the drawback that additional connectors are required to attach parts of the sensor, such as radiation sources and detectors at the ends of the waveguide. This adds process steps and cost to fabricating the sensor.

Problem to be Solved

It is an object of this invention to provide a sensor comprising an impact resistant waveguide by an efficient method of manufacture.

SUMMARY

This invention solves the above problem by providing an impact resistant waveguide comprising a clad surrounding a core. A reinforcing filler is incorporated in a curable silicone composition used to prepare the core, thereby imparting impact resistance to the core. A method of manufacture of the waveguide comprises injecting the curable silicone composition into a clad comprising tubing and thereafter curing the curable silicone composition.

DETAILED DESCRIPTION

All amounts, ratios, and percentages are by weight unless otherwise indicated. The articles "a", "an", and "the" each mean one or more.

Waveguide

The waveguide comprises a core surrounded by a clad. The core is a silicone elastomer having a refractive index higher than that of the clad. The difference between the core refractive index and the clad refractive index may be selected based on the end use of the waveguide. For example, in some applications, the difference may range from 0.005 to 0.55, alternatively 0.1 to 0.3. A difference in this range may be desirable, for example, when a relatively small bend radius is needed, e.g., when the waveguide will have to be bent to angles of 90° or higher in small areas. Alternatively, a smaller refractive index difference, such as 0.005 to 0.04 may be desirable when the waveguide will be used for digital data transmission applications over large distances.

Core

The core may be prepared by injecting a curable silicone composition into the clad and thereafter curing the composition. The core has a refractive index, which may range from 1.43 to 1.59, alternatively 1.46 to 1.54. A suitable composition comprises:

(I) a polyorganosiloxane with an average of at least two reactive, unsaturated organic groups per molecule, (II) a curing agent having an average of at least two silicon-bonded hydrogen atoms per molecule, (III) a hydrosilylation catalyst, and (IV) a reinforcing filler.

Component (I) Polyorganosiloxane

Component (I) in the composition is a polyorganosiloxane with an average of at least two unsaturated organic groups per molecule capable of undergoing a hydrosilylation reaction. Component (I) can be a homopolymer or a copolymer. Component (I) can have a linear, branched, or cyclic structure. The reactive, unsaturated organic groups per molecule in the component (I) can be located at terminal, pendant, or at both terminal and pendant positions. Component (I) may have a refractive index of 1.38 to 1.59. The amount of component (I) in the composition is 100 parts by weight. Component (I) can comprise siloxane units including, but not limited to, $R^2R^1{}_2SiO_{1/2}$, $R^1{}_3SiO_{1/2}$, $R^2R^1SiO_{2/2}$, $R^1{}_2SiO_{2/2}$, and $R^1SiO_{3/2}$ units. In the preceding formulae, each $R^1$ is independently a monovalent organic group. Suitable monovalent organic groups include, but are not limited to, alkyl groups such as methyl, ethyl, propyl, and butyl; alkenyl groups such as vinyl, allyl, and butenyl; alkynyl groups such as ethynyl and propynyl; aromatic groups such as phenyl, styryl, tolyl, xylyl, and benzyl. However, at least 5%, alternatively at least 50% of $R^1$ are aromatic groups. The amount of $R^1$ groups being aromatic groups may range from 10% to 90%. The exact amount of $R^1$ groups that are aromatic groups will depend on various factors including the filler selected. In general, when more aromatic groups are present, refractive index increases. Each $R^2$ is independently an unsaturated monovalent organic group. $R^2$ is exemplified by alkenyl groups such as vinyl, allyl, and butenyl and alkynyl groups such as ethynyl and propynyl. Component (I) may comprise a polydiorganosiloxane of the formula (A) $R^1_3SiO(R^1_2SiO)_\alpha(R^1R^2SiO)_\beta SiR^1_3$, (B) $R^1_2R^2SiO(R^1_2SiO)_\alpha(R^1R^2SiO)_\beta SiR^1_2R^2$, or (C) a combination thereof.

In these formulae, $R^1$ and $R^2$ are as described above, $\alpha$ has an average value of 0 to 20,000, and $\beta$ has an average value of 2 to 20,000.

Component (I) may comprise polydiorganosiloxanes such as dimethylvinylsiloxy-terminated poly(dimethylsiloxane/methylphenylsiloxane); dimethylvinylsiloxy-terminated poly(dimethylsiloxane/diphenylsiloxane); phenyl,methyl,vinyl-siloxy-terminated polydimethylsiloxane; and combinations thereof.

Component (I) can be a single polydiorganosiloxane or a combination comprising two or more polydiorganosiloxanes that differ in at least one of the following properties: structure, viscosity, average molecular weight, siloxane units, and sequence. Methods of preparing polydiorganosiloxanes suitable for use as component (I), such as hydrolysis and condensation of the corresponding organohalosilanes or equilibration of cyclic polydiorganosiloxanes, are well known in the art.

Component (II) Curing Agent

Component (II) may be a polyorganohydrogensiloxane having an average of at least two silicon-bonded hydrogen atoms per molecule. Component (II) can be a homopolymer or a copolymer. Component (II) can have a linear, branched, or cyclic structure. The silicon-bonded hydrogen atoms in the component (II) can be located at terminal, pendant, or at both terminal and pendant positions. The amount of component (II) in the composition is sufficient to cure the composition. The amount of component (II) is sufficient to provide 0.5 to 2 silicon bonded hydrogen atoms per reactive unsaturated organic group in, component (I) (SiH/unsaturated group ratio). Alternatively, SiH/unsaturated group ratio may range from 1.0 to 1.8.

Component (II) can comprise siloxane units including, but not limited to, $HR^3_2SiO_{1/2}$, $R^3_3SiO_{1/2}$, $HR^3SiO_{2/2}$, $R^3_2SiO_{2/2}$, and $HSiO_{3/2}$ units. In the preceding formulae, each $R^3$ is independently selected from monovalent organic groups free of aliphatic unsaturation.

Component (II) may comprise a compound of the formula (a) $R^3_3SiO(R^3_2SiO)_\gamma(R^3HSiO)_\delta SiR^3_3$, or (b) $R^3_2HSiO(R^3_2SiO)_\gamma(R^3HSiO)_\delta SiR^3_2H$, (c) a combination thereof.

In these formulae, $\gamma$ has an average value of 0 to 20,000, and $\delta$ has an average value of 2 to 20,000. Each $R^3$ is independently a monovalent organic group free of aliphatic unsaturation. Suitable monovalent organic groups free of aliphatic unsaturation include alkyl groups such as methyl, ethyl, propyl, and butyl; aromatic groups such as phenyl, styryl, tolyl, xylyl, and benzyl. At least 5%, alternatively at least 50% of $R^3$ may be aromatic groups. The amount of $R^3$ groups being aromatic groups may range from 10% to 90%. The exact amount of $R^3$ groups that are aromatic groups will depend on the various factors including the filler selected.

Component (II) is exemplified by dimethylhydrogensiloxy-terminated poly(dimethylsiloxane/methylphenylsiloxane); dimethylhydrogensiloxy-terminated poly(dimethylsiloxane/diphenylsiloxane); dimethylhydrogensiloxy-terminated poly(methylhydrogensiloxane/methylphenylsiloxane)siloxane; trimethylsiloxy-terminated poly(dimethylsiloxane/methylhydrogensiloxane/methylphenylsiloxane); phenyl,methyl,vinyl-siloxy-terminated poly(dimethylsiloxane/methylhydrogensiloxane); and combinations thereof.

Component (II) can be a combination of two or more organohydrogenpolysiloxanes that differ in at least one of the following properties: structure, average molecular weight, viscosity, siloxane units, and sequence. Methods of preparing linear, branched, and cyclic organohydrogenpolysiloxanes suitable for use as component (II), such as hydrolysis and condensation of organohalosilanes, are well known in the art.

Component (III) Hydrosilylation Catalyst

Suitable hydrosilylation catalysts are known in the art and commercially available. The hydrosilylation is added in an amount sufficient to catalyze the curing reaction of the composition. The amount of component (III) may range from 0.1 to 1000 ppm of a platinum group metal based on the weight of the composition, alternatively 10 to 100 ppm of a platinum group metal. The hydrosilylation catalyst may comprise a platinum group metal selected from platinum, rhodium, ruthenium, palladium, osmium or iridium metal or organometallic compound thereof, or a combination thereof. The hydrosilylation catalyst is exemplified by compounds such as chloroplatinic acid, chloroplatinic acid hexahydrate, platinum dichloride, and complexes of said compounds with low molecular weight organopolysiloxanes or platinum compounds microencapsulated in a matrix or coreshell type structure. Complexes of platinum with low molecular weight organopolysiloxanes include 1,3-diethenyl-1,1,3,3-tetramethyldisiloxane complexes with platinum. These complexes may be microencapsulated in a resin matrix.

Suitable hydrosilylation catalysts are described in, for example, U.S. Pat. Nos. 3,159,601; 3,220,972; 3,296,291; 3,419,593; 3,516,946; 3,814,730; 3,989,668; 4,784,879; 5,036,117; and 5,175,325 and EP 0 347 895 B. Microencapsulated hydrosilylation catalysts and methods of preparing them are known in the art, as exemplified in U.S. Pat. No. 4,766,176 and the references cited therein; and U.S. Pat. No. 5,017,654.

Component (I) Reinforcing Filler

Component (IV) is a reinforcing filler. The amount of component (IV) added to the composition depends on the type of filler selected, however, component (IV) may be added to the composition in an amount of 0.01% to 65% based on the weight of the composition. Suitable reinforcing fillers include silica such as fumed silica or colloidal silica; titania, silicon metal, aluminum, or a combination thereof. Suitable reinforcing fillers are known in the art and commercially available, such as fumed silica sold under the name CAB-O-SIL by Cabot Corporation of Massachusetts. The filler selected depends on various factors including the wavelength of the radiation to be transmitted by the waveguide and the properties of the filler. For example, when the particle size of the filler is greater than 10% of the wavelength of radiation to be transmitted, then the filler and polydiorganosiloxane are selected such that their refractive indexes match. "Match" means that refractive index of the filler and refractive index of the polydiorganosiloxane have values sufficiently close to one another such that the optical loss of the resulting waveguide is sufficiently low for a detector at the outlet of the waveguide to detect the radiation. For example, with a refractive index match within 1% between components (I) and (IV), a waveguide with a length of 2 m to 10 m can be prepared having a loss of 0.5 decibel per centimeter (dB/cm) or less. When the particle size of the filler is sufficiently less than approximately 10% of the wavelength of radiation to be transmitted, matching the refractive indexes of components (I) and (IV) is not necessary to reduce optical loss. Alternatively, the filler may have a particle size less than or equal to 10% of the wavelength of radiation to be transmitted through the wave guide, and the filler may have a filler refractive index, the polydiorganosiloxane may have a polydiorganosiloxane refractive index, and the filler refractive index may match the polydiorganosiloxane refractive index. One skilled in the art would be able to determine when refractive indexes of components (I) and (IV) should be matched without undue experimentation.

The filler may optionally be surface treated with a treating agent. Treating agents and treating methods are known in the art, see for example, U.S. Pat. No. 6,169,142 (col. 4, line 42 to col. 5, line 2). The filler may be treated with the treating agent prior to combining the filler with the other components of the composition, or the filler may be treated in situ.

The treating agent can be an alkoxysilane having the formula: $R^4_\epsilon Si(OR^5)_{(4-\epsilon)}$, where $\epsilon$ is 1, 2, or 3; alternatively $\epsilon$ is 3. $R^4$ is a monovalent organic group exemplified by monovalent hydrocarbon groups of 1 to 50 carbon atoms, alternatively 8 to 30 carbon atoms, alternatively 8 to 18 carbon atoms. $R^4$ is exemplified by alkyl groups such as hexyl, octyl, dodecyl, tetradecyl, hexadecyl, and octadecyl; and aromatic groups such as benzyl, phenyl and phenylethyl. $R^4$ can be saturated or unsaturated, branched or unbranched, and unsubstituted. $R^4$ can be saturated, unbranched, and unsubstituted.

$R^5$ is an unsubstituted, saturated hydrocarbon group of 1 to 4 carbon atoms. The treating agent is exemplified by hexyltrimethoxysilane, octyltriethoxysilane, decyltrimethoxysilane, dodecyltrimethyoxysilane, tetradecyltrimethoxysilane, phenyltrimethoxysilane, phenylethyltrimethoxysilane, octadecyltrimethoxysilane, octadecyltriethoxysilane, and a combination thereof.

Alkoxy-functional oligosiloxanes can also be used as treating agents. Alkoxy-functional oligosiloxanes and methods for their preparation are known in the art, see for example, EP 1 101 167 A2. For example, suitable alkoxy-functional oligosiloxanes include those of the formula $(R^6O)_\upsilon Si(OSiR^7_2R^8)_{4-\upsilon}$. In this formula, $\upsilon$ is 1, 2, or 3, alternatively $\upsilon$ is 3. Each $R^6$ can be an alkyl group. Each $R^7$ can be independently selected from saturated and unsaturated monovalent hydrocarbon groups of 1 to 10 carbon atoms. Each $R^8$ can be a saturated or unsaturated monovalent hydrocarbon group having at least 11 carbon atoms.

Silazanes may also be used as treating agents. For example, hexamethyldisilazane may be used.

Optional Component (V) Cure Modifier

Component (V) is an optional cure modifier that may be added to the composition. Component (V) can be added to extend the shelf life or working time, or both, of the composition. Component (V) can be added to raise the curing temperature of the composition. Suitable cure modifiers are known in the art and are commercially available.

Component (V) is exemplified by acetylenic alcohols such as methyl butynol, ethynyl cyclohexanol, dimethyl hexynol, and combinations thereof; cycloalkenylsiloxanes such as methylvinylcyclosiloxanes exemplified by 1,3,5,7-tetramethyl-1,3,5,7-tetravinylcyclotetrasiloxane, 1,3,5,7-tetramethyl-1,3,5,7-tetrahexenylcyclotetrasiloxane, and combinations thereof; ene-yne compounds such as 3-methyl-3-penten-1-yne, 3,5-dimethyl-3-hexen-1-yne; triazoles such as benzotriazole; phosphines; mercaptans; hydrazines; amines such as tetramethyl ethylenediamine, dialkyl fumarates, dialkenyl fumarates, dialkoxyalkyl fumarates, maleates, and combinations thereof. Suitable cure modifiers are disclosed by, for example, U.S. Pat. Nos. 3,445,420; 3,989,667; 4,584,361; and 5,036,117.

The amount of component (V) added to the composition will depend on the particular cure modifier used, the nature and amount of component (III), and the composition of component (II). However, the amount of component (V) may be 0.001% to 10% based on the weight of the composition.

Clad

Suitable clads are known in the art and are commercially available. For example, SILASTIC® brand tubing, which is commercially available from Dow Corning Corporation of Midland, Mich., U.S.A. is suitable for use as a clad. When SILASTIC® tubing is used, the clad refractive index is less than 1.45, alternatively 1.40 to 1.42. Suitable coating compositions that may be applied inside the clad are known in the art and are commercially available. For example, SYLGARD® 184, which is commercially available from Dow Corning Corporation, is suitable to use as a coating composition. Without wishing to be bound by theory, it is thought that the coating improves loss characteristic of the waveguide.

Sensors

The waveguide described above has an inlet and an outlet. The sensor of this invention comprises the waveguide and a radiation source at the inlet of the waveguide or a detector at the outlet of the waveguide, or both. Alternatively, the sensor may comprise a radiation emitting and detecting device at the inlet of the waveguide and a reflector, such as a mirror, at the outlet of the waveguide. The radiation source may be for example, a LED device. The detector may be, for example, a photodiode or phototransistor.

Method of Manufacture

This invention further relates to a method for preparing the waveguide and sensor described above. The method comprises:
(1) injecting a curable silicone composition into a clad having an inlet and an outlet,
(2) curing the composition to form a core after step (1), thereby forming a waveguide having an inlet and an outlet. The method may optionally further comprise inserting a radiation source into the composition at the inlet of the waveguide before step (2). The method may optionally further comprise inserting a detector into the composition at the outlet of the waveguide before step (2).

The method may optionally further comprise applying a coating composition to the inside of the clad and curing the coating composition to from a cured coating before step (1). Step (2) and the optional step of applying the coating composition may be performed, for example, by heating at a temperature of 100 to 200° C., alternatively 150 to 200° C. for 30 minutes to 2 hours. This may provide the benefit of reducing interface roughness, thereby reducing optical loss.

The method of this invention may provide the benefit that insertion of the radiation source and detector eliminates the need to couple the light into the waveguide through complex optical lens arrangements.

Methods of Use

The sensor of this invention may be used as pressure sensor or light guide for automotive or medical applications. When the emitter is a LED, the sensor may be used for collimation of light. Automotive applications include fender crash sensors, vehicle safety zone sensors, anti-pinch sensors for sunroofs, electric sliding doors, and windows, pedestrian impact severity reduction mechanisms, and passenger detection in a seat. Without wishing to be bound by theory, it is thought that the optical sensor of this invention has greater accuracy, faster response time, and higher reliability than electro-mechanical sensors (e.g., piezo electric).

EXAMPLES

These examples are intended to illustrate the invention to one of ordinary skill in the art and should not be interpreted as limiting the scope of the invention set forth in the claims.

Example 1

A core composition was prepared by mixing 60 grams (g) Base, 115 g dimethylvinyl siloxy-terminated, poly(dimethylsiloxane/phenylmethylsiloxane), 3.9 g Crosslinker, 2.4 g Chain Extender, 0.013 g Catalyst, and 0.03 g Surfynol 61. The Base contained 32% hexamethyldisilazane treated fumed silica and 68% phenyl,methyl,vinyl siloxy-terminated poly(dimethylsiloxane/phenylmethylsiloxane) having a refractive index ranging from 1.465 to 1.475, viscosity ranging from 1425 to 2600 cSt at 25° C., and vinyl content ranging from 0.67 to 0.78%. The Crosslinker was trimethylsiloxy-terminated, poly(dimethylsiloxane/methylhydrogensiloxane) having Si—H content ranging from 0.71 to 0.85% and viscosity 5 cSt (mm$^2$/s). The Chain Extender was a dimethylhydrogen siloxy-terminated polydimethylsiloxane from Gelest, Inc. The Catalyst was a mixture containing 0.8% platinum and tetramethyldivinyldisiloxane. Surfynol 61 is 3,5-dimethyl-1-hexyn-3-ol from Nissan Chemical Industry Co., Ltd.

The mixture was first de-aired under vacuum (<20 Torr) at room temperature. A syringe was then filled with the resulting de-aired mixture. The syringe was used to inject the de-aired mixture into a 0.5 meter (m) long SILASTIC® Laboratory Tubing manufactured by Dow Corning Corporation. A 3 millimeter (mm) diameter LED emitter from Fiber Optic Products, Inc. was pushed into the inlet. The resulting article was placed into an oven and heated for 1 hour (h) at 150° C. The resulting waveguide has a loss of 0.375 decibels per centimeter (dB/cm). No crack was observed when the waveguide was repeatedly hit with a hammer.

A waveguide according to example 1 is shown in FIG. 1. The waveguide comprises the SILASTIC® clad 101 and a silicone elastomer core 102 prepared by curing the composition as described above.

Example 2

A core composition was prepared by mixing 60 g Base, 115 g dimethylvinyl siloxy-terminated, poly(dimethylsiloxane/phenylmethylsiloxane), 3.9 g Crosslinker, 2.4 g Chain Extender, 0.013 g Catalyst, and 0.03 g Surfynol 61. The Base, Crosslinker, Chain Extender, Catalyst, and Surfynol were the same as in Example 1.

The mixture was first de-aired under vacuum (<20 Torr) at room temperature. A syringe was then filled with the resulting de-aired mixture. The syringe was used to inject the de-aired mixture into a 0.5 meter (m) long SILASTIC® Laboratory Tubing manufactured by Dow Corning Corporation. The resulting article was placed into an oven and heated for 1 hour (h) at 150° C. to prepare a waveguide. The waveguide was taken out of the oven and cooled to room temperature. The core to 0.5 centimeter (cm) from the end was removed with a spatula. The tubing was filled with several drops of uncured mixture prepared as above. The article was de-aired again under vacuum. The end of the tubing was filled with uncured mixture again. A 3 mm LED light source from Fiber Optic Products, Inc. was pushed into the tube. The resulting article was placed into an oven and heated for 30 min. This immobilized the LED in the resulting sensor.

The optical loss was measured using the cut-back method with the tube end re-aligned close to a Si photodiode sensor after each cut. The data are compiled in Table 1 below.

TABLE 1

Loss measurement (cut-back method) of filled tube

| Initial tube length [cm] | Cut-off piece length [cm] | Tube length l [cm] | Light power P [mW] | ln P |
|---|---|---|---|---|
| 73.4 | 0 | 73.4 | 1.17 | 0.1570 |
|  | 12.1 | 61.3 | 3.66 | 1.2975 |
|  | 10.5 | 50.8 | 8.79 | 2.1736 |
|  | 9.1 | 41.7 | 16.28 | 2.7899 |
|  | 9.0 | 32.7 | 38.3 | 3.6454 |
|  | 6.3 | 26.4 | 68.1 | 4.2210 |
|  | 6.6 | 19.8 | 129 | 4.8598 |
|  | 5.8 | 14.0 | 213 | 5.3613 |

Note:
The LED current was kept constant at 16.8 mA

FIG. 2 is a semi logarithmic plot of output power (measured at the tube end) versus tube length showing the expected exponential dependence. The loss for example 2 is L=0.38 dB/cm.

Example 3

A 36-cm long SILASTIC® Laboratory Tubing (¼" ID; ⅜" OD) manufactured by Dow Corning Corporation was filled with a core composition. The core composition was prepared by mixing 60 grams (g) Base, 115 g dimethylvinyl siloxy-terminated, poly(dimethylsiloxane/phenylmethylsiloxane), 3.9 g Crosslinker, 2.4 g Chain Extender, 0.013 g Catalyst, and 0.03 g Surfynol 61. The Base, Crosslinker, Chain Extender, Catalyst, and Surfynol were the same as in Example 1. The mixture was first de-aired under vacuum (<20 Torr) at room temperature. A syringe was then filled with the material and used to push it into the tubing. A 3 mm LED light emitter and detector (from Radio Shack) were pushed into each end of the tubing. The tubing was placed into an oven and heated for 1 h at 150° C.

The response of the tube sensor was evaluated under conditions of variable compression applied to the tube. A ⅜" diameter rod was placed at 90° angle across the sensor tube. Pressure was applied to the metal rod, and the output power of the detector was measured as a function of the compression distance relative to the flat surface on which the tube sensor was resting. The result is shown in Table 2 and plotted in FIG. 3.

TABLE 2

Out power as a function of compression

| Compression distance (mil) | Output Power (mW) |
|---|---|
| 0 | 538 |
| 20 | 466 |
| 40 | 394 |
| 60 | 328 |
| 80 | 265.8 |
| 100 | 207.2 |
| 120 | 158.8 |
| 140 | 122.6 |
| 160 | 95.3 |
| 180 | 76.3 |
| 200 | 60.3 |

TABLE 2-continued

Out power as a function of compression

| Compression distance (mil) | Output Power (mW) |
|---|---|
| 164 | 89 |
| 9 | 476 |
| 0 | 509 |

The last three data points in the table show that there remains a small temporary deformation of the tube after the compression is removed (not plotted).

FIG. 4 shows a sensor according to example 3. The sensor includes a waveguide 404 including a core 402 and a clad 407. The sensor further includes a radiation source (LED emitter) 401 inserted in the core 402 at the inlet 403 of a waveguide 404 and a radiation detector 405 at the outlet 406 of the waveguide 404.

Example 4

In this example, the internal surface of the SILASTIC® Laboratory Tubing manufactured by Dow Corning Corporation was coated with SYLGARD® to decrease interface roughness and thereby improve the loss characteristic. To a 3 m long tubing was injected 12 g of SYLGARD® 184. The tubing was hung at one end to the ceiling and SYLGARD® 184 ran down the inside surface of the tubing. The resulting coating was cured at room temperature for 24 hours (hr). The tube was cut to a length of 2.5 m and was then filled with a mixture that was prepared by combining 60 g Base, 115 g dimethylvinyl siloxy-terminated, poly(dimethylsiloxane/phenylmethylsiloxane), 3.9 g Crosslinker, 2.4 g Chain Extender, 0.013 g Catalyst, and 0.03 g Surfynol 61. The Base, Crosslinker, Chain Extender, Catalyst, and Surfynol were the same as in Example 1. The resulting filled tubing was placed into a 150° C. oven and heated for 1 h. The optical loss of the cured light guide as measured using cutback method is 0.211 dB/cm. No crack was observed when the waveguide was repeatedly hit with a hammer.

A cross section of a waveguide according to example 4 is shown in FIG. 5. The waveguide comprises the SILASTIC® clad 501, a cured SYLGARD® 184 coating 502 inside the clad, and a silicone elastomer core 503 prepared by curing the composition as described above.

Comparative Example 1

A curable composition without reinforcing filler was prepared containing 11 parts tris(dimethylvinylsiloxy)methylsilane, 68 parts phenyl,methyl,vinylsiloxy-terminated poly(dimethylsiloxane/phenylmethylsiloxane), 21 parts dimethylhydrogensiloxy-terminated, phenyl silsesquioxane resin, less than 1 part 1,3-diethenyl-1,1,3,3-tetramethyldisiloxane complexes with platinum, 0.06 part tetramethyldivinyldisiloxane, and 0.30 part dimethyl-1-hexyn-3-ol. This composition was first de-aired under vacuum (<20 Torr) at room temperature. A 0.5 m long SILASTIC® Laboratory Tubing manufactured by Dow Corning Corporation was then filled with the de-aired composition. The filled tubing was placed into a 150° C. oven and heated for 1 h to form a waveguide. The optical loss measured using cutback method was 0.314 dB/cm. When the waveguide was hit with a hammer, the core broke and shattered. This comparative example shows the importance of filler to make the waveguide impact resistant and the inability of a resin to impart a desired degree of impact resistance in this composition.

INDUSTRIAL APPLICABILITY

The waveguide and sensor of this invention may be advantageous in that no primer or adhesive is needed between the core and the clad. This renders the methods for their preparation more efficient than if a primer or adhesive has to be applied between the core and clad. Furthermore, optical waveguides 2 to 10 meters long may be prepared according to this invention. Low loss in the optical waveguides of this invention allow optical waveguides of these lengths to be prepared. Waveguide loss may be less than 0.5 dB/cm, alternatively 0.2 to 0.5 dB/cm. Matching refractive index of the filler with the polydiorganosiloxane (when the particle size of the filler exceeds 10% of the wavelength of radiation to be transmitted) and decreasing interface roughness may reduce optical loss.

DRAWINGS

FIG. 1 is a cross section of a waveguide according to example 1.

FIG. 2 is a graph showing light power transmitted through a waveguide as function of waveguide length.

FIG. 3 is a graph showing response to waveguide deformation under compression.

FIG. 4 is a cross section of a sensor according to example 3.

FIG. 5 is a cross section of a waveguide according to example 4.

| Reference Numerals | |
|---|---|
| 101 | clad |
| 102 | core |
| 401 | radiation source |
| 402 | core |
| 403 | inlet to waveguide |
| 404 | waveguide |
| 405 | radiation detector |
| 406 | outlet of waveguide |
| 407 | clad |
| 501 | clad |
| 502 | coating |
| 503 | core |

The invention claimed is:

1. An optical waveguide comprising:
   (A) a core having a core refractive index, and
   (B) a clad surrounding the core, where the clad has a clad refractive index smaller than the core refractive index;
   where the core comprises a reaction product of a curable silicone composition comprising
      (i) 100 parts by weight of a polydiorganosiloxane having an average of at least two terminally-unsaturated organic groups per molecule,
      (ii) an amount sufficient to cure the composition of a curing agent having an average of at least two silicon-bonded hydrogen atoms per molecule,
      (iii) an amount sufficient to catalyze curing the composition of a hydrosilylation catalyst, and
      (iv) an amount sufficient to impart impact resistance to a cured product of the curable silicone composition of a reinforcing filler;
   where the optical waveguide has a loss of 0.5 dB/cm or less.

2. A method of making an optical waveguide comprising:
(I) injecting a curable silicone composition into the clad, where the curable silicone composition comprises
  (i) 100 parts by weight of a polydiorganosiloxane having an average of at least two terminally-unsaturated organic groups per molecule,
  (ii) an amount sufficient to cure the composition of a curing agent having an average of at least two silicon-bonded hydrogen atoms per molecule,
  (iii) an amount sufficient to catalyze curing the composition of a hydrosilylation catalyst, and
  (iv) an amount sufficient to impart impact resistance to a cured product of the curable silicone composition of a reinforcing filler; and
(II) thereafter curing the composition to form the core, thereby forming an optical waveguide having an inlet and an outlet.

3. The method of claim 2 where the optical waveguide has a length ranging from 2 cm to 10 m.

4. The method of claim 2, where the filler has a particle size greater than 10% of wavelength of radiation to be transmitted through the waveguide, and the filler has a filler refractive index, the polydiorganosiloxane has a polydiorganosiloxane refractive index, and the filler refractive index matches the polydiorganosiloxane refractive index.

5. The method of claim 2, where the filler has a particle size less than or equal to 10% of wavelength of radiation to be transmitted through the waveguide.

6. The method of claim 2, where the filler has a particle size less than or equal to 10% of the wavelength of radiation to be transmitted through the wave guide and the filler has a filler refractive index, the polydiorganosiloxane has a polydiorganosiloxane refractive index, and the filler refractive index matches the polydiorganosiloxane refractive index.

7. The method of claim 2, further comprising inserting a radiation emitter into the composition at the inlet after step (I) and before step (II).

8. The method of claim 7, further comprising: inserting a detector into the composition at the outlet of the clad after step (I) and before step (III).

9. The method of claim 8 where the emitter is a light emitting diode device.

10. The method of claim 8, where the detector is a photodiode or phototransistor.

11. A sensor prepared by the method of claim 10.

12. The optical waveguide of claim 1, where component (i) comprises 100 parts by weight, based on the weight of the composition, of a polydiorganosiloxane of formula (A) $R^1_3SiO(R^1_2SiO)_\alpha(R^1R^2SiO)_\beta SiR^1_3$,
(B) $R^1_2R^2SiO(R^1_2SiO)_\alpha(R^1R^2SiO)_\beta SiR^1_2R^2$, or
(C) a combination thereof;

where each $R^1$ is independently a monovalent organic group, with the proviso that at least 5% of $R^1$ are aromatic groups,
each $R^2$ is independently an unsaturated monovalent organic group,
subscript $\alpha$ has an average value of 0 to 20,000, and
subscript $\beta$ has an average value of 2 to 20,000.

13. The optical waveguide of claim 1, where component (ii) comprises a compound of the formula
(a) $R^3_3SiO(R^3_2SiO)_\gamma(R^3HSiO)_\delta SiR^3_3$, or
(b) $R^3_2HSiO(R^3_2SiO)_\gamma(R^3HSiO)_\delta SiR^3_2H$,
(c) a combination thereof, where
subscript $\gamma$ has an average value of 0 to 20,000,
subscript $\delta$ has an average value of 2 to 20,000, and
each $R^3$ is independently a monovalent organic group free of aliphatic unsaturation; and with the proviso that component (ii) comprises a combination of two or more organohydrogenpolysiloxanes that differ in at least one property selected from the group consisting of structure, average molecular weight, viscosity, siloxane units, and sequence.

14. The optical waveguide of claim 1, where component (iii) comprises an amount of catalyst sufficient to provide 0.1 to 1000 ppm of a platinum group metal based on the weight of the composition.

15. The optical waveguide of claim 1, where component (iv) comprises 0.01% to 65%, based on the weight of the composition, of a reinforcing filler selected from the group consisting of silica, titania, silicon metal, aluminum, and a combination thereof.

16. The optical waveguide of claim 12, further comprising (v) 0.001% to 10%, based on the weight of the composition, of a cure modifier.

17. The optical waveguide of claim 12, where the filler has a particle size less than or equal to 10% of the wavelength of radiation to be transmitted by the optical waveguide.

18. The optical waveguide of claim 12, where the filler has a particle size greater than 10% of a wavelength of radiation to be transmitted by the optical waveguide, and the filler and polydiorganosiloxane are selected such that their refractive indexes match.

* * * * *